US012680657B2

(12) United States Patent
Yu

(10) Patent No.: US 12,680,657 B2
(45) Date of Patent: Jul. 14, 2026

(54) BACKLIGHT PANELS

(71) Applicant: WUHAN CHINA STAR OPTOELECTRONICS TECHNOLOGY CO., LTD., Wuhan (CN)

(72) Inventor: Shuliang Yu, Wuhan (CN)

(73) Assignee: WUHAN CHINA STAR OPTOELECTRONICS TECHNOLOGY CO., LTD., Wuhan (CN)

(*) Notice: Subject to any disclaimer, the term of this patent is extended or adjusted under 35 U.S.C. 154(b) by 0 days.

(21) Appl. No.: 19/199,752

(22) Filed: May 6, 2025

(65) Prior Publication Data

US 2025/0271109 A1 Aug. 28, 2025

Related U.S. Application Data

(63) Continuation of application No. 18/037,761, filed as application No. PCT/CN2023/078861 on Feb. 28, 2023, now Pat. No. 12,313,226.

(30) Foreign Application Priority Data

Feb. 10, 2023 (CN) ......................... 202310123854.8

(51) Int. Cl.
*F21K 9/20* (2016.01)
*F21V 33/00* (2006.01)
(Continued)

(52) U.S. Cl.
CPC ............ *F21K 9/20* (2016.08); *F21V 33/0052* (2013.01); *F21Y 2105/12* (2016.08); *F21Y 2105/18* (2016.08); *F21Y 2115/10* (2016.08)

(58) Field of Classification Search
CPC ............................... F21K 9/20; F21V 33/0052
See application file for complete search history.

(56) References Cited

U.S. PATENT DOCUMENTS 9,218,759 B2 * 12/2015 Wong .................. G09G 3/2003
10,295,124 B2 5/2019 Andrews
(Continued)

FOREIGN PATENT DOCUMENTS

CN 1713055 A 12/2005
CN 101476703 A 7/2009
(Continued)

OTHER PUBLICATIONS

Chinese Office Action issued in corresponding Chinese Patent Application No. 202310123854.8 dated Jan. 20, 2025, pp. 1-10, 22pp.

(Continued)

*Primary Examiner* — Bryon T Gyllstrom
(74) *Attorney, Agent, or Firm* — The Roy Gross Law Firm, LLC; Roy D. Gross

(57) ABSTRACT

A backlight panel is provided, which includes a substrate including first and second light-emitting areas, first light-emitting devices arranged in rows and in columns in the first light-emitting area, and second light-emitting devices arranged in rows and in columns in the second light-emitting area. The first light-emitting area overlaps the center of the backlight panel. The second light-emitting area is located on a side of the first light-emitting area. A first coincident boundary is formed between the first and second light-emitting areas, and a second coincident boundary is formed between the second light-emitting area and the backlight panel. In the row direction, the distance between at least one second light-emitting device closest to the second coincident boundary and another adjacent second light-emitting device
(Continued)

is less than a distance between any two adjacent first light-emitting devices.

20 Claims, 8 Drawing Sheets

(51) Int. Cl.

| | |
|---|---|
| ***F21Y 105/12*** | (2016.01) |
| ***F21Y 105/18*** | (2016.01) |
| ***F21Y 115/10*** | (2016.01) |

(56) References Cited

U.S. PATENT DOCUMENTS

| | | | | |
|---|---|---|---|---|
| 10,437,101 | B2 | 10/2019 | Sako et al. | |
| 10,698,259 | B2 * | 6/2020 | Son | G02F 1/133606 |
| 10,859,240 | B2 * | 12/2020 | Cheng | F21V 9/32 |
| 11,428,984 | B2 * | 8/2022 | Katsumata | G02F 1/133605 |
| 2006/0087827 | A1 * | 4/2006 | Jung | G02B 19/0028 362/23.18 |
| 2006/0273891 | A1 | 12/2006 | Quach et al. | |
| 2010/0079977 | A1 | 4/2010 | Lee et al. | |
| 2012/0126711 | A1 | 5/2012 | Suminoe et al. | |
| 2012/0205689 | A1 * | 8/2012 | Welch | H10H 20/856 257/91 |
| 2013/0329415 | A1 * | 12/2013 | Lin | F21V 14/00 362/227 |
| 2017/0167717 | A1 | 6/2017 | Duarte | |
| 2019/0156735 | A1 | 5/2019 | Wang et al. | |
| 2019/0325814 | A1 | 10/2019 | Chang et al. | |
| 2020/0020675 | A1 | 1/2020 | Vissenberg et al. | |
| 2020/0285117 | A1 | 9/2020 | Hashimoto et al. | |

FOREIGN PATENT DOCUMENTS

| | | | |
|---|---|---|---|
| CN | 201964266 | U | 9/2011 |
| CN | 202032395 | U | 11/2011 |
| CN | 102434811 | A | 5/2012 |
| CN | 102968931 | A | 3/2013 |
| CN | 107622735 | A | 1/2018 |
| CN | 207094385 | U | 3/2018 |
| CN | 107919087 | A | 4/2018 |
| CN | 207752251 | U | 8/2018 |
| CN | 207833181 | U | 9/2018 |
| CN | 208421468 | U | 1/2019 |
| CN | 110289283 | A | 9/2019 |
| CN | 110737130 | A | 1/2020 |
| CN | 111522170 | A | 8/2020 |
| CN | 112505966 | A | 3/2021 |
| CN | 113809113 | A | 12/2021 |
| CN | 114242746 | A | 3/2022 |
| CN | 114942547 | A | 8/2022 |
| CN | 218099876 | U | 12/2022 |
| EP | 3916297 | A1 | 12/2021 |
| RU | 2465683 | C1 | 10/2012 |
| TW | M570965 | U | 12/2018 |
| WO | 2018084215 | A1 | 11/2018 |

OTHER PUBLICATIONS

Chinese Office Action issued in corresponding Chinese Patent Application No. 202310123854.8 dated Mar. 19, 2025, pp. 1-5, 11pp.

Chinese Office Action issued in corresponding Chinese Patent Application No. 202310123854.8 dated Jun. 11, 2025, pp. 1-8, 16pp.

PCT International Search Report for International Application No. PCT/CN2023/078861, mailed on Oct. 23, 2023, 8pp.

PCT Written Opinion of the International Searching Authority for International Application No. PCT/CN2023/078861, mailed on Oct. 23, 2023, 5pp.

* cited by examiner

BACKLIGHT PANELS

CROSS-REFERENCE TO RELATED APPLICATIONS

This application is a continuation application of U.S. patent application Ser. No. 18/037,761, filed on May 18, 2023, which is a US national phase application based upon an International Application No. PCT/CN2023/078861, filed on Feb. 28, 2023, which claims priority to Chinese Patent Application No. 202310123854.8, filed on Feb. 10, 2023. The disclosures of the aforementioned applications are incorporated herein by reference in their entireties.

TECHNICAL FIELD

The present disclosure relates to the field of display technologies, and in particular, to backlight panels.

BACKGROUND

In a backlight module of a micro light-emitting diode (micro-LED for short) display screen having an irregular shape, micro-LEDs are generally arranged at equal intervals, so a large dark area is reserved at an irregular edge. Thus, in a power-on state, an area provided with the LEDs is brighter and an area provided without any LED is darker, which may result in poor optical performance of nonuniform luminance, so that the display screen cannot properly display contents, with optical interference and distortion. In another aspect, when the LEDs in partial areas need to be adjusted as a whole, the LEDs located at the irregular edge cannot be adjusted, resulting in poor uniformity of the whole panel and deteriorated optical specifications of the display screen.

SUMMARY

Embodiments of the present disclosure provide a backlight panel, including: a substrate comprising a first light-emitting area and a second light-emitting area; a plurality of first light-emitting devices arranged, in rows and in columns, in the first light-emitting area; and a plurality of second light-emitting devices arranged, in rows and in columns, in the second light-emitting area.

The first light-emitting area overlaps a center of the backlight panel, the second light-emitting area is located on a side of the first light-emitting area, a boundary of the second light-emitting area close to the first light-emitting area coincides with a boundary of the first light-emitting area to form a first coincident boundary, and a boundary of the second light-emitting area away from the first light-emitting area coincides with a boundary of the backlight panel to form a second coincident boundary;

The first light-emitting devices and the second light-emitting devices have the same row direction and column direction. In the row direction, each of the second light-emitting devices has a distance from another adjacent one of the second light-emitting devices. The distance between at least one of the second light-emitting devices closest to the second coincident boundary and another adjacent one of the second light-emitting devices in the row direction is less than a distance between any two adjacent ones of the first light-emitting devices in the row direction.

BRIEF DESCRIPTION OF THE DRAWINGS

In order to explain technical solutions in the embodiments of the present disclosure more clearly, the drawings used in the description of the embodiments of the present disclosure will be briefly introduced. Obviously, the drawings in the following description merely illustrate several embodiments of the present disclosure. For those skilled in the art, other drawings can be obtained based on these drawings without creative work.

DETAILED DESCRIPTION OF EMBODIMENTS

Figure 1:
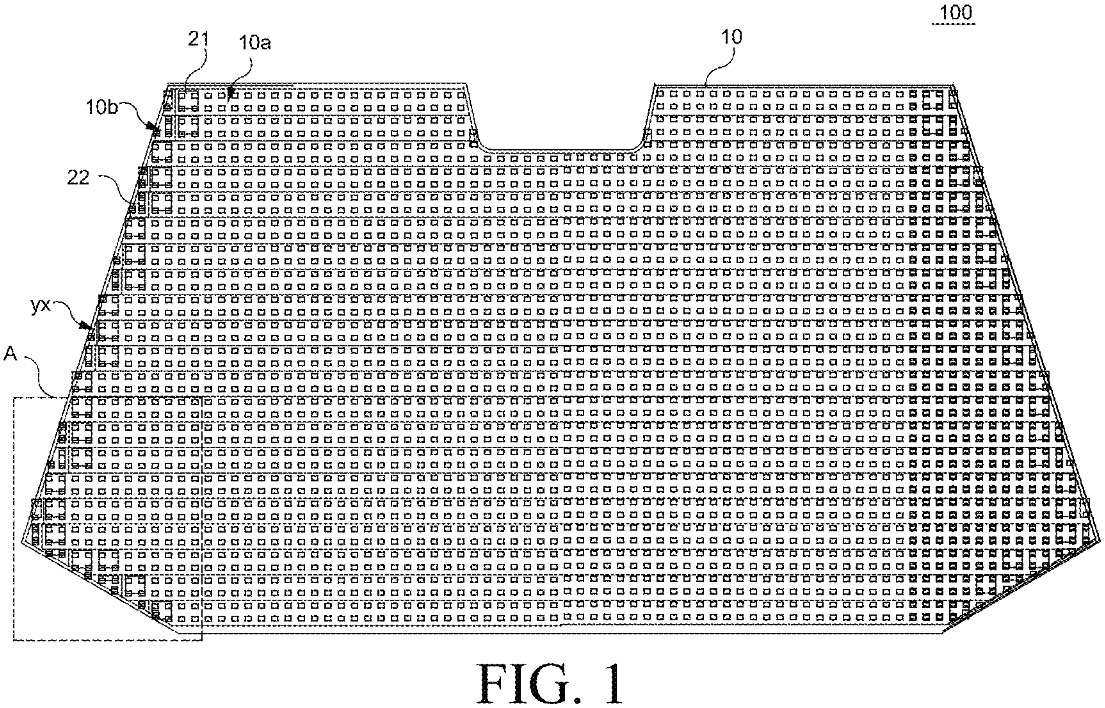
FIG. 1 is a schematic view of a first structure of a backlight panel according to Embodiment I of the present disclosure.

The technical solutions in the embodiments of the present disclosure will be clearly and completely described with reference to the accompanying drawings in the embodiments of the present disclosure. Obviously, the described embodiments merely indicate a part of the embodiments of the present disclosure, but not all the embodiments. Based on the embodiments in the present disclosure, all other embodiments obtained by those skilled in the art without creative work fall into the protection scope of the present disclosure. Additionally, it should be understood that the specific embodiments described herein are merely intended to illustrate and interpret the invention and are not intended to limit the invention. In the present disclosure, without contrary statement, orientational terms such as “up” and “down” are normally used to refer to up and down of the device in actual use or operation, specifically the orientations shown in the drawings; and “inside” and “outside” refer to contours of the device.

Backlight panels provided in the embodiments of the present disclosure will be introduced in detail below. It should be noted that an order of description of the following embodiments is not intended to indicate the preferred order of embodiments.

Embodiment I

Figure 2:
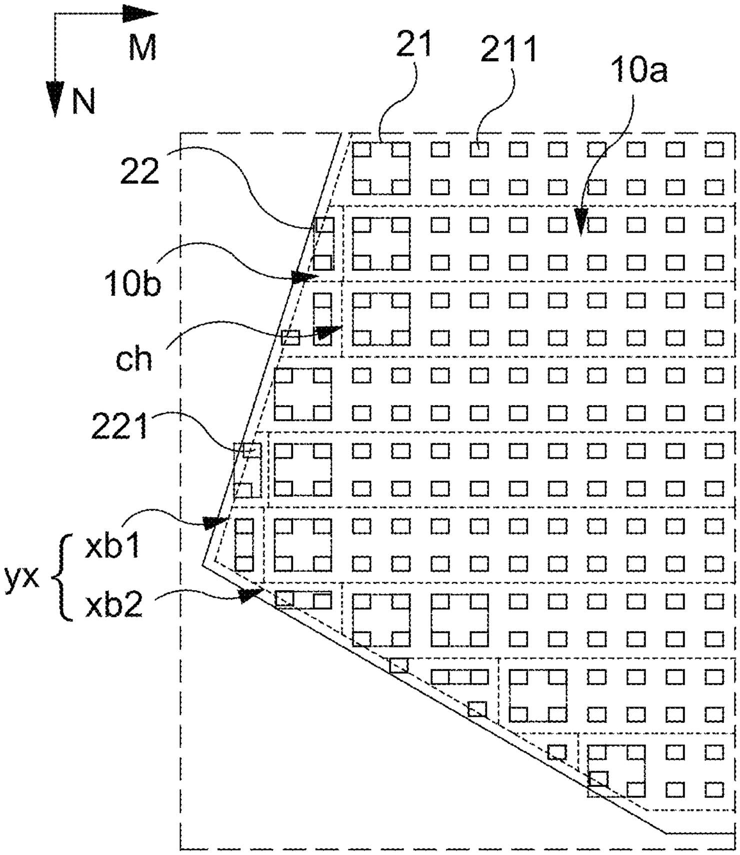
FIG. 2 is an enlarged view of a part A shown in FIG. 1.

Referring to FIG. 1 and FIG. 2, the embodiments of the present disclosure provide a backlight panel 100, including a substrate 10, a plurality of first light-emitting units 21, and one or more second light-emitting units 22.

The substrate 10 includes one or more first light-emitting areas 10*a* and one or more second light-emitting areas 10*b*, and the second light-emitting areas 10*b* are located on at least one side of the first light-emitting areas 10*a*. A boundary of each second light-emitting area 10*b* coincides with a boundary of one of the first light-emitting areas 10*a* to form a coincident boundary ch. The first light-emitting area 10*a* includes a first axial direction M and a second axial direction N perpendicular to each other. The second light-emitting areas 10*b* each further include an irregular boundary yx located on a side of the coincident boundary ch away from the first light-emitting area 10*a*. An extending direction of the irregular boundary yx intersects each of the first axial direction M and the second axial direction N.

The plurality of first light-emitting units 21 are arranged, in rows along the first axial direction M and in columns along the second axial direction N, in the one or more first light-emitting areas 10*a*. The first light-emitting units 21 each include at least two first light-emitting devices 211.

The one or more second light-emitting units 22 are disposed in the one or more second light-emitting areas 10*b*. The second light-emitting units 22 each include one or more second light-emitting devices 221.

An area of each of the second light-emitting units 22 is less than an area of the first light-emitting unit 21.

It should be noted that the area of the first light-emitting unit 21 refers to an occupied area of the corresponding first light-emitting unit 21, and the area of the second light-emitting unit 22 refers to an occupied area of the corresponding second light-emitting unit 22.

Herein, the occupied area refers to a sum of areas of the light-emitting devices and areas therebetween. In the embodiment, the light-emitting devices refer to the first light-emitting devices 211 and the second light-emitting devices 221.

In the embodiment I of the present disclosure, the second light-emitting units each having a smaller occupied area are provided, so irregular light-emitting areas (referring to the second light-emitting areas) each having a smaller area can be provided with the foregoing second light-emitting devices, thereby increasing a space utilization rate of the irregular light-emitting areas, enhancing luminance of the irregular light-emitting areas, and then improving uniformity of overall luminance of the panel.

Optionally, all of the first light-emitting devices 211 in each first light-emitting unit 21 are configured to emit light at same time. All of the second light-emitting devices 221 in each second light-emitting unit 22 are configured to emit light at same time. Each of the first light-emitting units 21 and the second light-emitting units 22 is configured to emit light independently, thereby achieving regionalization control of luminous of the backlight panel 100.

In condition of regionalization luminous, an area (referring to an irregular area) adjacent to the irregular boundary yx has a smaller area and is irregular, in which the first light-emitting unit 21 having a large occupied area and a rectangular pattern cannot be arranged, so the second light-emitting units 22 each having a small occupied area and a suitable layout pattern are arranged in the irregular areas (referring to the second light-emitting areas 10*b*), thereby reducing a risk of low luminance of the irregular areas.

Optionally, the first light-emitting devices 211 and the second light-emitting devices 221 may each be a micro-LED, a mini-LED, or other small LED device.

Optionally, the irregular boundary may be an oblique boundary or an arc boundary. The arc boundary may be a circular arc boundary or a non-circular arc boundary.

For example, as shown in FIG. 1 and FIG. 2, a combination of the irregular boundaries yx includes first oblique boundaries xb1 and second oblique boundaries xb2, and the second oblique boundaries xb2 are each connected to one corresponding first oblique boundary xb1. A plurality of second light-emitting areas 10*b* (those are irregular areas) are defined along extending directions of the first oblique boundaries xb1 and the second oblique boundary xb2. Some second light-emitting areas 10*b* each include a part of the first oblique boundary xb1, and some second light-emitting area 10*b* each include a part of the second oblique boundary xb2. The first light-emitting area 10*a* is disposed on a side of the second light-emitting area 10*b* away from its irregular boundary yx.

Figure 3:
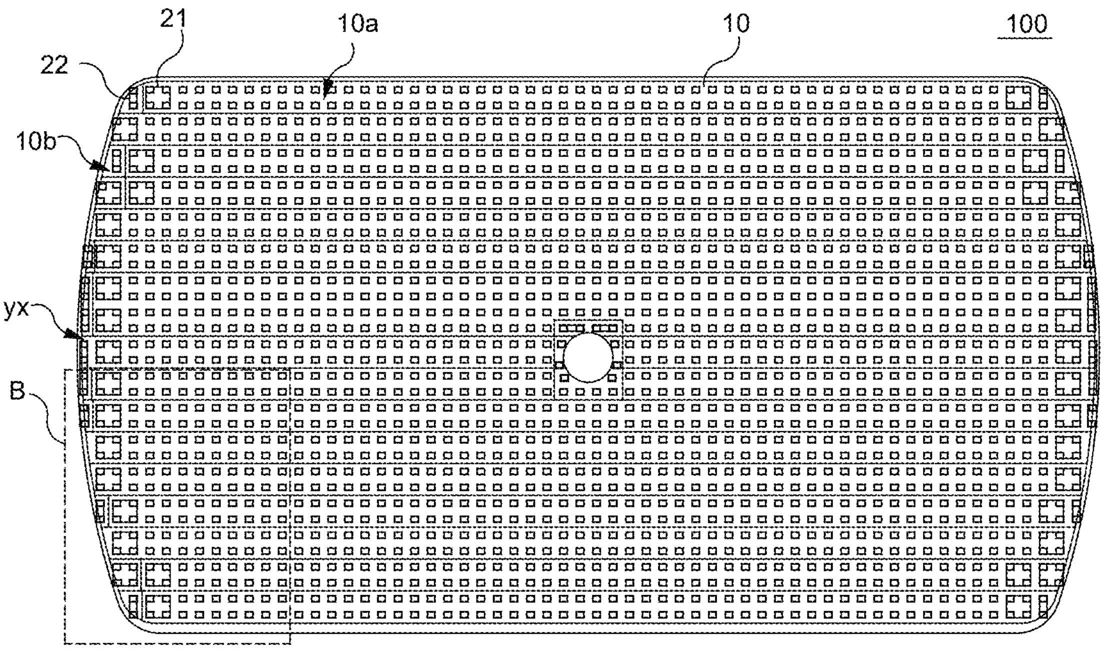
FIG. 3 is a schematic view of a second structure of a backlight panel according to Embodiment I of the present disclosure.
Figure 4:
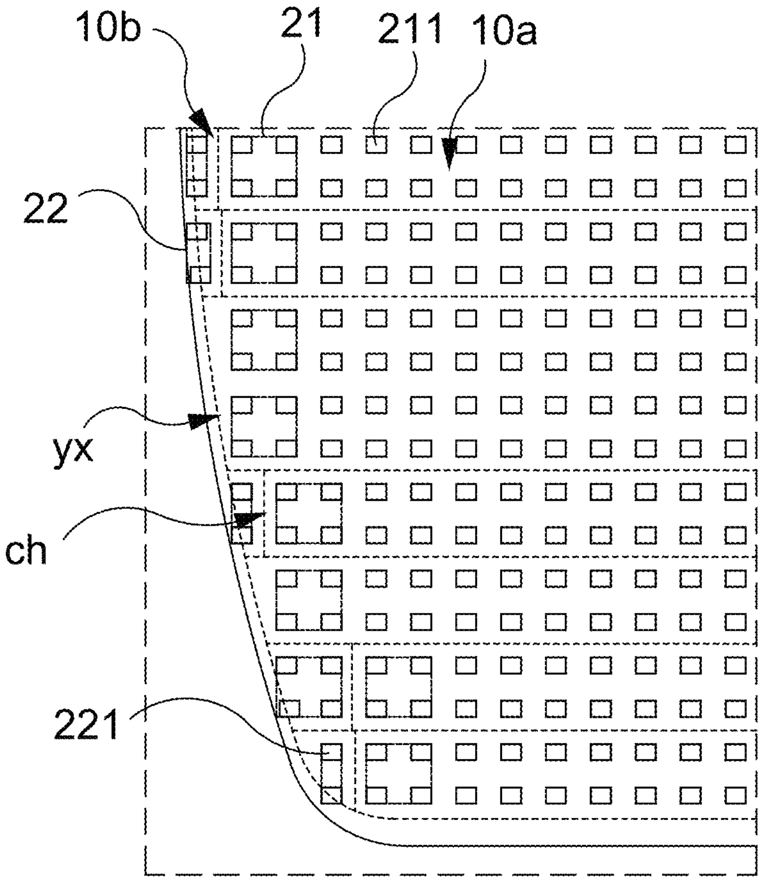
FIG. 4 is an enlarged view of a part B shown in FIG. 3.

For example, as shown in FIG. 3 and FIG. 4, a combination of the irregular boundaries yx includes arc boundaries. A plurality of second light-emitting areas 10*b* (those are irregular areas) are defined along extending directions of the arc boundaries. The second light-emitting area 10*b* each include a part of the arc boundary. The first light-emitting area 10*a* is disposed on a side of the adjacent second light-emitting area 10*b* away from its irregular boundary yx.

Figure 5:
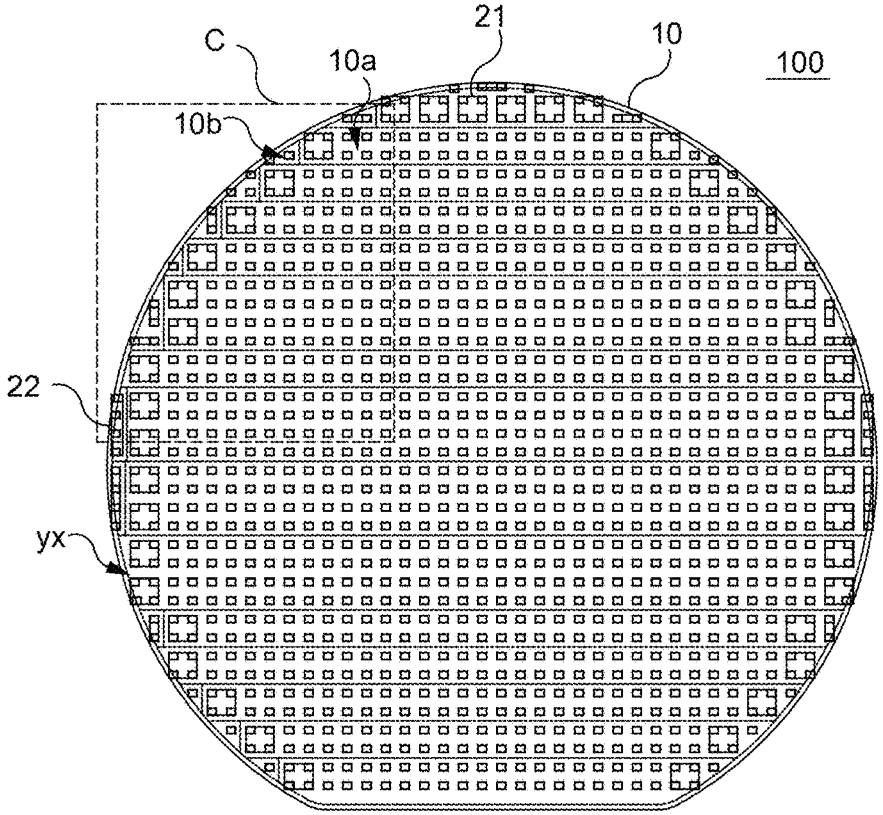
FIG. 5 is a schematic view of a third structure of a backlight panel according to Embodiment I of the present disclosure.
Figure 6:
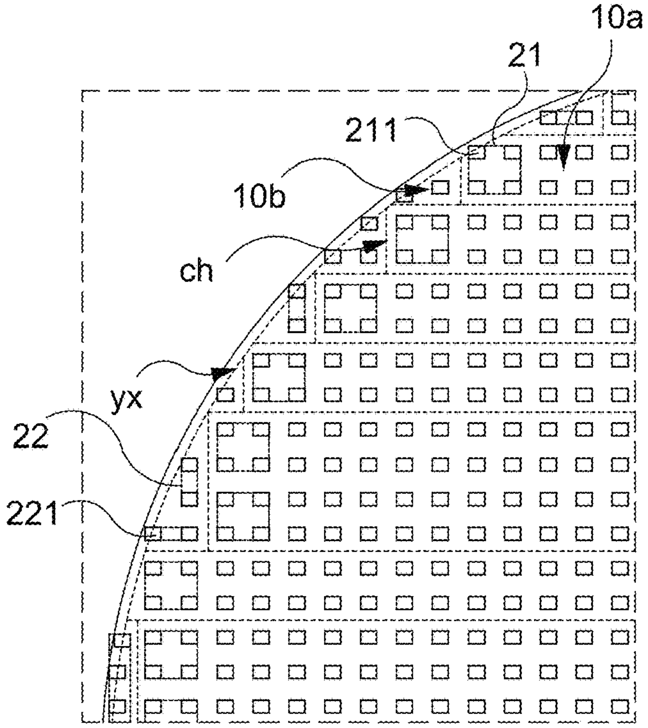
FIG. 6 is an enlarged view of a part C shown in FIG. 5.

For example, as shown in FIG. 5 and FIG. 6, a combination of the irregular boundaries includes a circular arc boundary. A plurality of second light-emitting areas 10*b* (those are irregular areas) are defined along an extending direction of the circular arc boundary. The second light-emitting areas 10*b* each include a part of the circular arc boundary. The first light-emitting area 10*a* is disposed on a side of the second light-emitting area 10*b* away from its irregular boundary yx.

Optionally, a number of the second light-emitting devices 221 in each second light-emitting unit 22 is less than a number of the first light-emitting devices 211 in each first light-emitting unit 21.

In other words, the number of the second light-emitting devices 221 in the second light-emitting unit 22 relatively decreases, so as to reduce the occupied area of the foregoing second light-emitting unit 22, and change the layout pattern of the foregoing second light-emitting devices 221. Thus, the second light-emitting unit 22 is suitable for the second light-emitting area 10*b* (that is the irregular area), thereby increasing the luminance of the second light-emitting area 10*b*.

Optionally, the second light-emitting unit 22 may also be adjusted to suit corresponding irregular boundary yx, such as by adjusting a distance between adjacent second light-emitting units 22 thereof, and/or, by adjusting an arrangement direction of the second light-emitting devices 221 thereof. For example, the second light-emitting unit 22 includes a series of second light-emitting devices 221 adjacent to the irregular boundary yx, a virtual line for connecting respective centers of the series of second light-emitting devices 221 extends in a direction same with the extending direction of the irregular boundary yx.

Optionally, the first light-emitting unit 21 includes a first length in the first axial direction M and a second length in the second axial direction N.

At least a part of the second light-emitting area 10*b* has a length in the first axial direction M less than the first length, and/or, at least a part of the second light-emitting area 10*b* has a length in the second axial direction N less than the second length.

In other words, a size of the second light-emitting area 10*b* is correspondingly less than a size of the first light-emitting unit 21, so the first light-emitting unit 21 cannot be arranged in the second light-emitting area 10*b*. Thus, according to a change in the size of the second light-emitting area 10*b*, a size and a pattern of the second light-emitting unit 22 therein may be accordingly adjusted to suit the second light-emitting area 10*b*.

For example, the second light-emitting area 10*b* having a larger area may be provided with a larger number of the second light-emitting devices 221 therein, and the second light-emitting area 10*b* having a smaller area may be provided with a smaller number of the second light-emitting devices 221 therein.

In addition, according to a pattern of the second light-emitting area 10*b*, a layout pattern of the second light-emitting devices 221 may be different to suit the second light-emitting area 10*b*. For example, when the second light-emitting area 10*b* is a triangle with a narrow top and a wide bottom or similar to the foregoing triangle, a layout pattern including one upper second light-emitting device 221 and two lower second light-emitting devices 221 may be adopted to suit the second light-emitting area 10*b*, a layout pattern including one upper second light-emitting device 221 and one lower second light-emitting device 221 may be adopted to suit the second light-emitting area 10*b* with a further decreased size, and a layout pattern including one second light-emitting device 221 may be adopted to suit the second light-emitting area 10*b* with a further decreased size.

Optionally, a distance between every two adjacent first light-emitting devices 211 is equal to a distance between the first light-emitting device 211 and the second light-emitting device 221 adjacent to each other.

In this way, a layout of the light-emitting devices in the first light-emitting area 10*a* and a layout of the light-emitting devices in the second light-emitting area 10*b* tend to be uniform, so as to improve uniformity of overall luminance of the backlight panel 100.

Embodiment II

Figure 7:
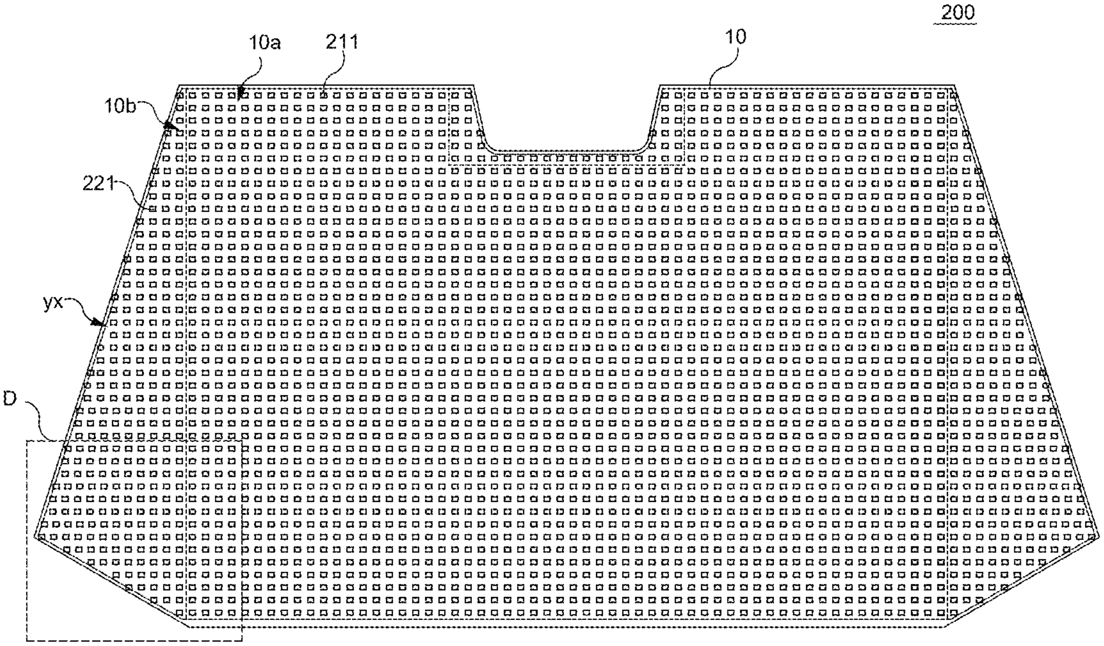
FIG. 7 is a schematic view of a first structure of a backlight panel according to Embodiment II of the present disclosure.
Figure 8:
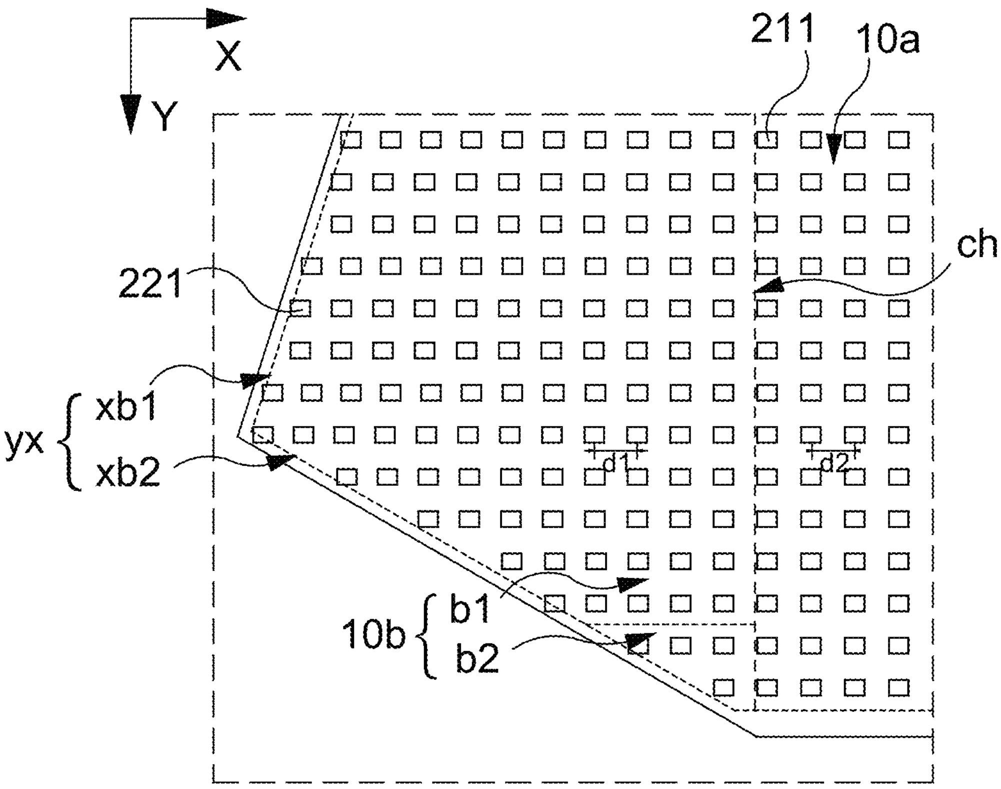
FIG. 8 is an enlarged view of a part D shown in FIG. 7.

Referring to FIG. 7 and FIG. 8, a backlight panel 200 is further accordingly provided in the embodiments of the present disclosure. The backlight panel 200 includes a substrate 10, a plurality of first light-emitting devices 211, and a plurality of second light-emitting devices 221.

The substrate 10 includes one or more first light-emitting areas 10*a* and one or more second light-emitting areas 10*b*, and the second light-emitting areas 10*b* are located on at least one side of the first light-emitting areas 10*a*. A boundary of each of the second light-emitting area 10*b* coincides with a boundary of the first light-emitting area 10*a* to form a coincident boundary ch.

The plurality of first light-emitting devices 211 are arranged, in rows and in columns, in the one or more first light-emitting areas 10*a*. The plurality of second light-emitting devices 221 are arranged, in rows and in columns, in the one or more second light-emitting areas 10*b*. A first distance d1 is defined between every two adjacent second light-emitting devices 221 along a row direction X of the second light-emitting devices 221.

Herein, the second light-emitting areas 10*b* each include an irregular boundary yx located on a side of the coincident boundary ch away from the adjacent first light-emitting area 10*a*. An extending direction of the irregular boundary yx intersects the row direction X, but not perpendicularly.

The first distance d1 increases along the row direction X from the irregular boundary yx towards the first light-emitting area 10*a*.

In the embodiment II of the present disclosure, the second light-emitting devices 221 are arranged in irregular light-emitting areas (referring to the second light-emitting areas), and the first distance d1 between every two adjacent second light-emitting devices 221 is gradually varied, so an arrangement of more second light-emitting devices 221 can be maximized in a part of the second light-emitting area 10*b* adjacent to the irregular boundary yx, thereby increasing a space utilization rate of the second light-emitting areas 10*b*, enhancing luminance of the second light-emitting areas, and in turn improving uniformity of overall luminance of the panel.

It can be understood that the first distance d1 increases along the row direction X from the irregular boundary yx towards the first light-emitting area 10*a*. In other words, a distribution density of the second light-emitting devices 221 is larger since closer to the irregular boundary yx. In this way, a small area at the irregular boundary yx can be provided with the second light-emitting devices 221 to improve a luminous rate at the irregular boundary yx. At the same time, luminance of the backlight panel 200 at edge areas (referring to the second light-emitting areas) can be further improved according to gradually varied distribution density. Thus, uniformity of overall luminance of the panel is improved.

Optionally, the first light-emitting devices 211 and the second light-emitting devices 221 may each be a micro-LED, a mini-LED, or other small LED device.

Optionally, the one or more second light-emitting areas 10*b* each include a gradient subarea b1 and a non-gradient subarea b2 arranged along a column direction Y of the second light-emitting devices 221.

In the gradient subarea b1, the first distance d1 increases along the row direction X from the irregular boundary yx towards the first light-emitting area 10*a*.

In the non-gradient subarea b2, the first distance d1 is constant along the row direction X from the irregular boundary yx towards the first light-emitting area 10*a*.

It should be noted that an arrangement of the second light-emitting devices 221 in the non-gradient subarea b2 is simple, and the distance between every two adjacent second light-emitting devices 221 is constant. The luminance of the second light-emitting areas 10*b* can be well adjusted according to the foregoing design of the non-gradient subareas b2, so as to avoid a risk of the second light-emitting areas 10*b* being too bright compared to the first light-emitting area 10*a*. That is, that a luminance of the non-gradient subarea b2 is less than a luminance of the gradient subarea b1 is avoided. Optionally, a distribution density of the second light-emitting devices 221 in the non-gradient subarea b2 is less than a distribution density of the second light-emitting devices 221 in the gradient subarea b1.

Optionally, a second distance d2 is defined between every two adjacent first light-emitting devices 211 in the row direction X. In the non-gradient subarea b2, the first distance d1 is equal to the second distance d2.

The first distance d1 is equal to the second distance d2 in the non-gradient subarea b2, so a distribution density of the first light-emitting devices 211 in the first light-emitting area 10*a* is equal to a distribution density of the second light-emitting devices 221 in the non-gradient subarea b2. Thus, luminance in per unit area of the first light-emitting area 10*a* and luminance in per unit area of the non-gradient subarea b2 are same, thereby improving uniformity of overall luminance of the panel.

In the embodiment, as shown in FIG. 8, a combination of the irregular boundaries yx includes first oblique boundaries xb1 and second oblique boundaries xb2, and the second oblique boundaries xb2 are each connected to one corresponding first oblique boundary xb1. The second light-emitting area 10*b* includes the first oblique boundary xb1 and the second oblique boundary xb2. The first light-emitting area 10*a* is located at a side of the second light-emitting areas 10*b* away from the irregular boundary yx.

Herein, the gradient subarea b1 is correspondingly defined at a connecting portion of the first oblique boundary xb1 and the second oblique boundary xb2. The gradient subarea b1 includes a part of the first oblique boundary xb1 and a part of the second oblique boundary xb2.

Because a pattern at the connecting portion of the first oblique boundary xb1 and the second oblique boundary xb2 is seriously deformed, the gradient subarea b1 is accordingly designed, so as to maximize an arrangement of light-emitting devices in the irregular area, thereby improving luminance of the irregular area.

Figure 9:
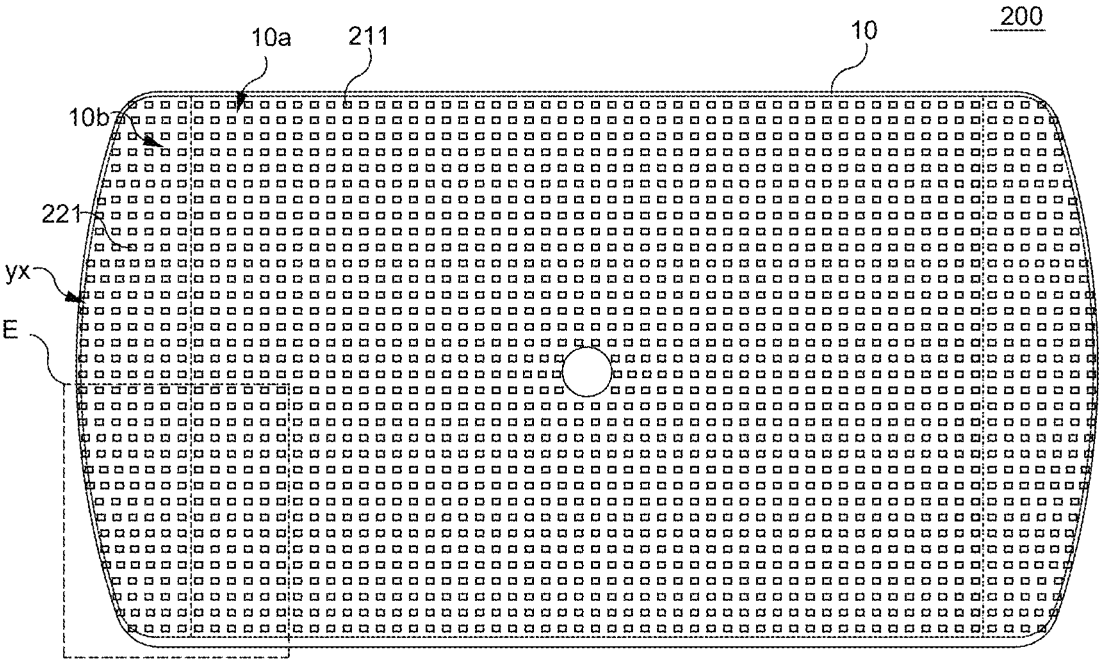
FIG. 9 is a schematic view of a second structure of a backlight panel according to Embodiment II of the present disclosure.
Figure 10:
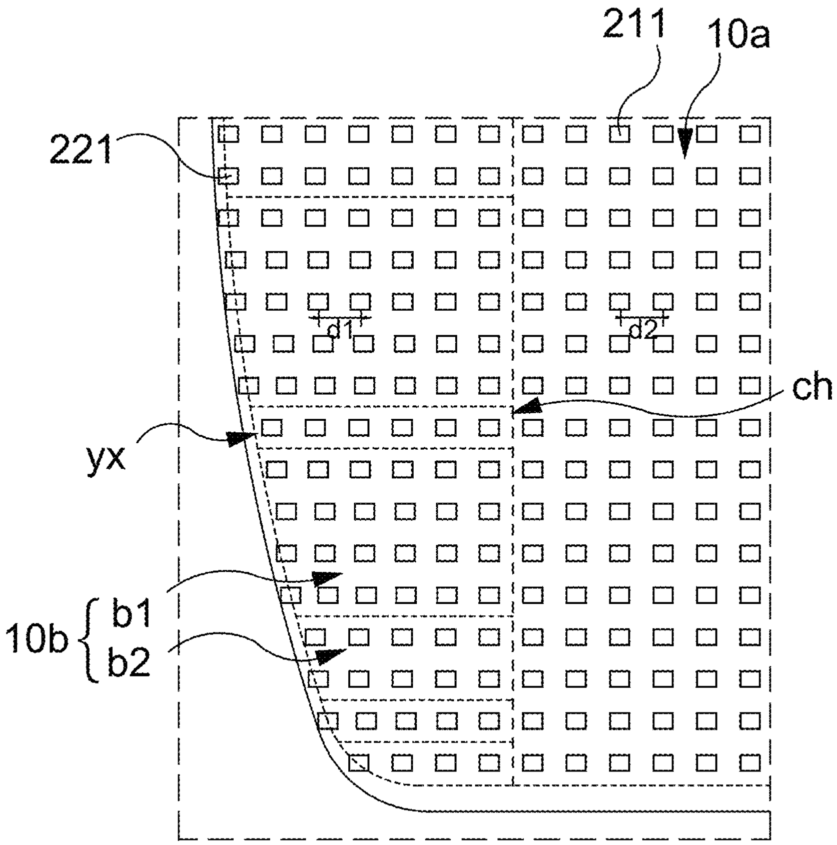
FIG. 10 is an enlarged view of a part E shown in FIG. 9.

In some embodiments, as shown in FIG. 9 and FIG. 10, a combination of the irregular boundaries yx includes arc boundaries. The second light-emitting area 10*b* includes the arc boundary. The first light-emitting area 10*a* is located at a side of the second light-emitting area 10*b* away from the irregular boundary yx.

Figure 11:
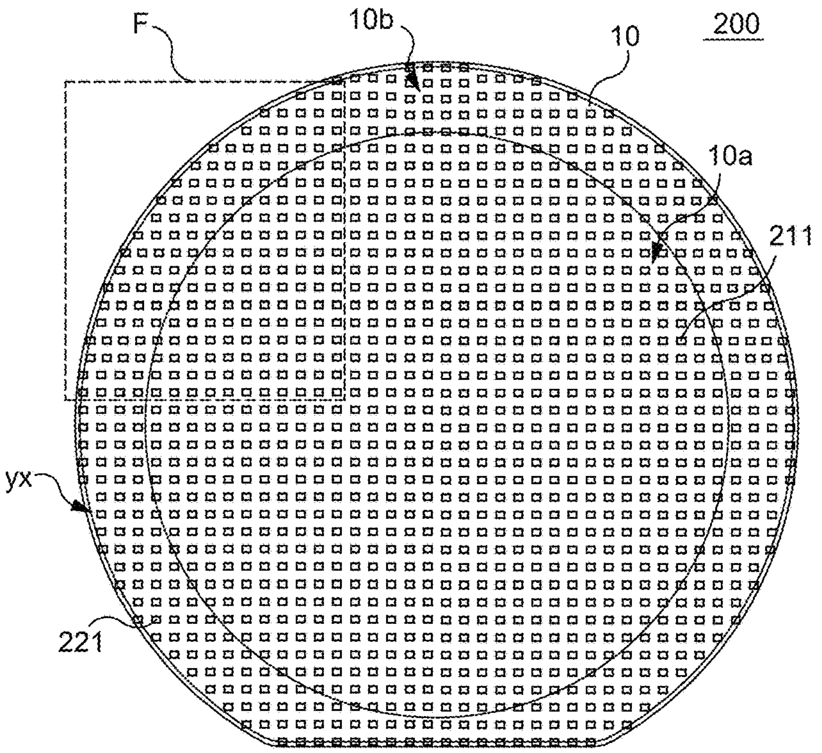
FIG. 11 is a schematic view of a third structure of a backlight panel according to Embodiment II of the present disclosure.
Figure 12:
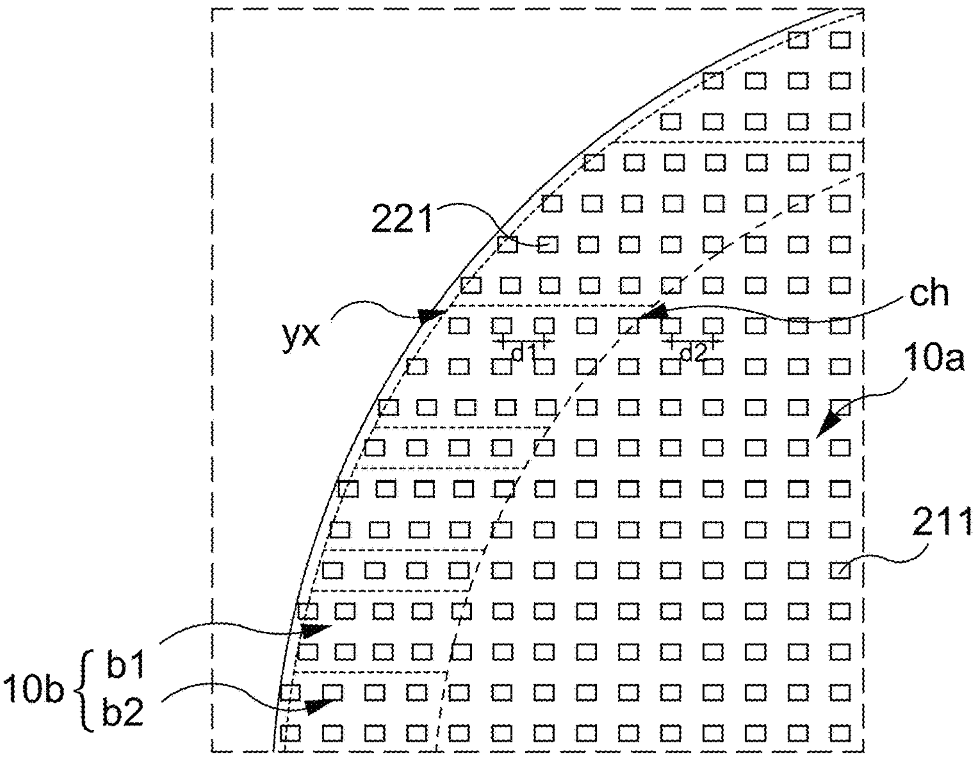
FIG. 12 is an enlarged view of a part F shown in FIG. 11.

In some embodiments, as shown in FIG. 11 and FIG. 12, a combination of the irregular boundaries includes a circular arc boundary. The second light-emitting area 10*b* includes the circular arc boundary. The first light-emitting area 10*a* is located at a side of the second light-emitting area 10*b* away from the irregular boundary yx.

Herein, the second light-emitting area 10*b* is shaped as a circular ring, and the first light-emitting area 10*a* is located at an inner side of the second light-emitting area 10*b*.

It should be noted that, for arrangements of the gradient subarea b1 and the non-gradient subarea b2 in the second light-emitting area 10*b*, the second light-emitting area 10*b* may be first simulated as the non-gradient subarea b2, and when a part of the area at the irregular boundary yx presents as a large empty space, the foregoing non-gradient subarea b2 corresponding to the large empty space may be changed to the gradient subarea b1. The foregoing design can be applied in any shaped backlight panels 200.

Embodiment III

Figure 13:
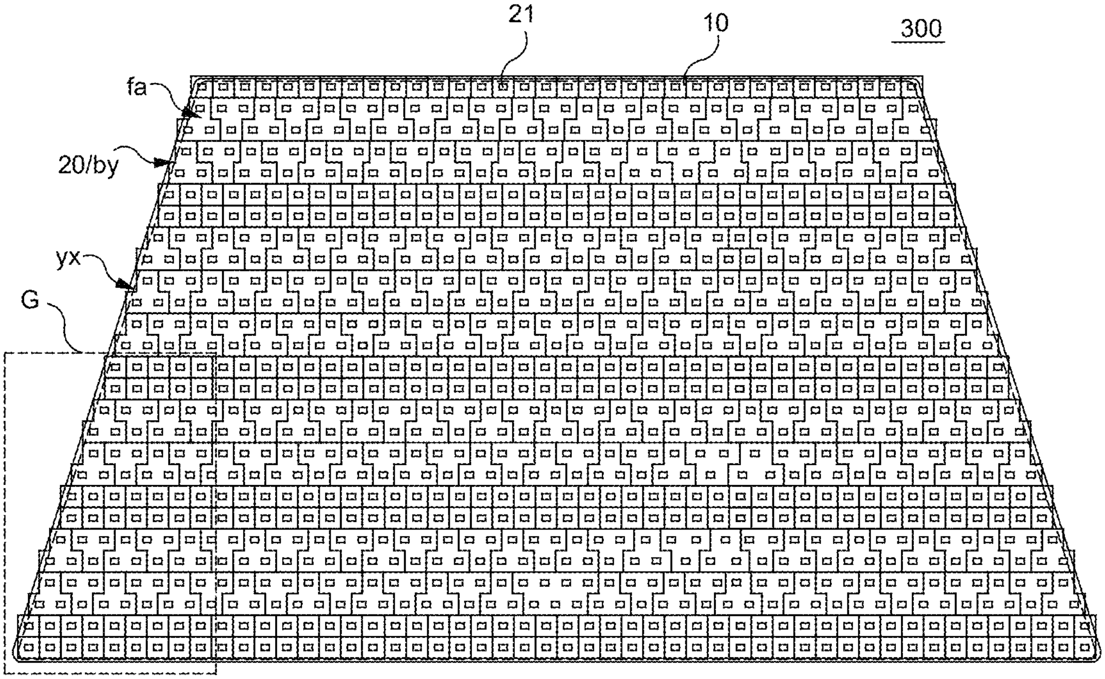
FIG. 13 is a schematic view of a first structure of a backlight panel according to Embodiment III of the present disclosure.
Figure 14:
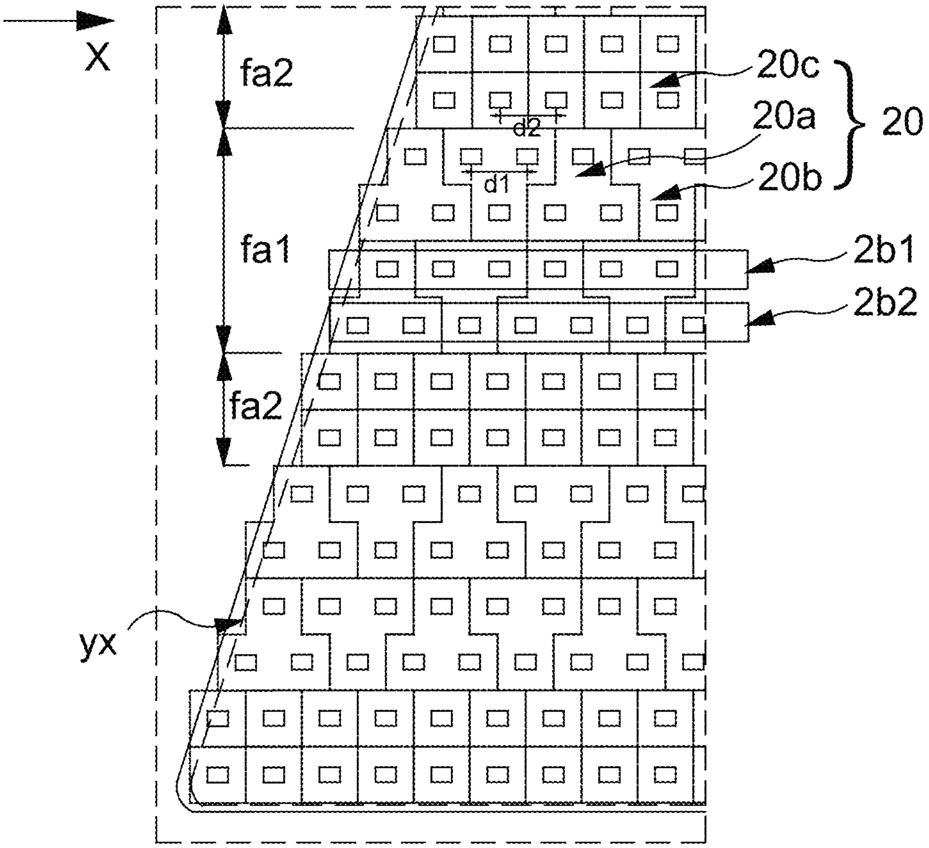
FIG. 14 is an enlarged view of a part G shown in FIG. 13.

Referring to FIG. 13 and FIG. 14, a backlight panel 300 is further accordingly provided in the embodiments of the present disclosure. The backlight panel 300 includes a substrate 10 and a plurality of light-emitting units 20.

The substrate 10 includes a light-emitting area fa, and the light-emitting area fa includes an irregular boundary yx.

The plurality of light-emitting units 20 are arranged in rows. A plurality of rows of the light-emitting units 20 are arranged in the light-emitting area fa. The light-emitting units 20 each include at least three light-emitting devices 2*a*.

An extending direction of the irregular boundary yx intersects a row direction X of the light-emitting units 20, but not perpendicularly. The light-emitting units 20 in each row closest to the irregular boundary yx are defined as edge units by. Among the edge units by, a series of light-emitting devices 2*a* closest to the irregular boundary yx are arranged along the extending direction of the irregular boundary yx.

In the embodiment III of the present disclosure, the light-emitting device 2*a* arranged along the extending direction of the irregular boundary yx are provided to adaptively suit the area adjacent to the irregular boundary yx, so as to improve a space utilization rate and improve luminance at the irregular boundary yx, and improve uniformity of overall luminance of the backlight panel 300.

Optionally, the irregular boundary yx may include oblique boundaries. Respective centers of a series of light-emitting devices 2*a* in the edge units by those are closest to the oblique boundary are in a straight line having a slope equal to a slope of the oblique boundary.

Figure 15:
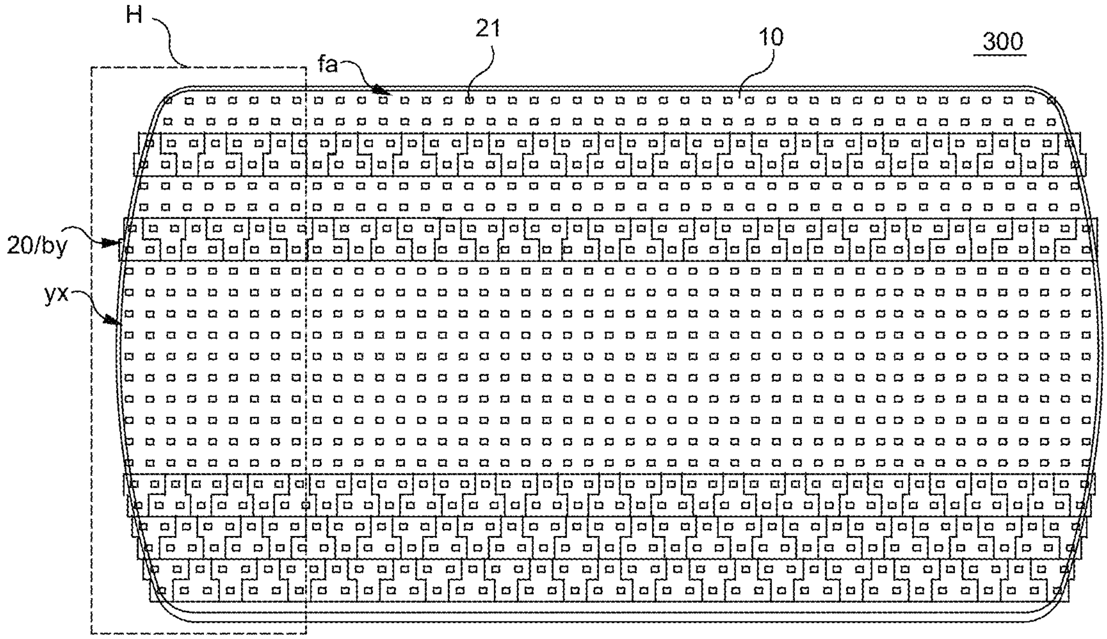
FIG. 15 is a schematic view of a second structure of a backlight panel according to Embodiment III of the present disclosure.
Figure 16:
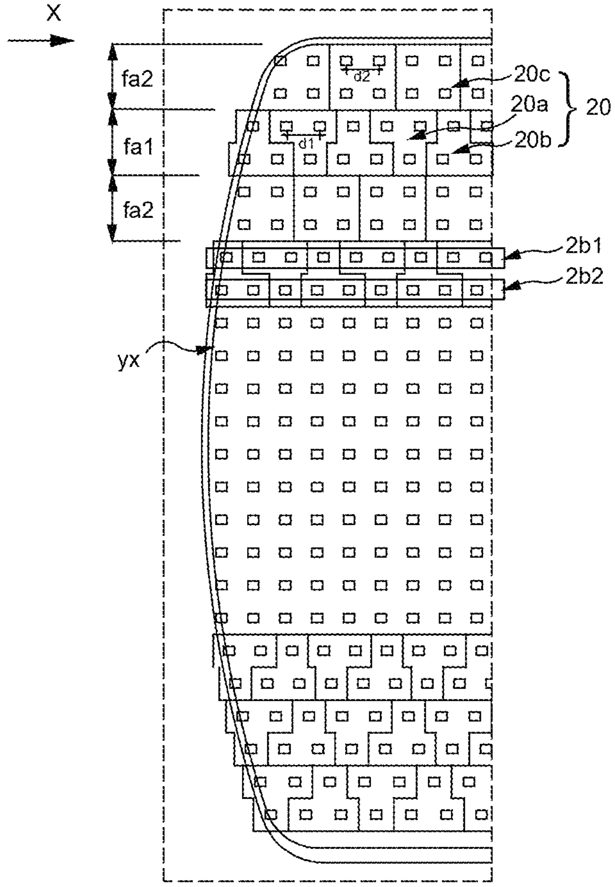
FIG. 16 is an enlarged view of a part H shown in FIG. 15.

Optionally, referring to FIG. 15 and FIG. 16, in some embodiments, the irregular boundary yx includes arc boundaries. Respective centers of a series of light-emitting devices 2*a* in the edge unit by those are closest to the arc boundary are in an arc line having a radian equal to a radian of the arc boundary corresponding to the edge unit by.

Optionally, the light-emitting devices 2*a* may each be a micro-LED, a mini-LED, or other small LED device.

Optionally, the plurality of light-emitting units 20 include first light-emitting units 20*a* and second light-emitting units 20*b*. The first light-emitting units 20*a* and the second light-emitting units 20*b* are alternately arranged along a row direction X of the light-emitting units 20. Each of the edge units by in each row of the light-emitting units 20 is one of the first light-emitting units 20*a* and the second light-emitting units 20*b*.

The light-emitting units 20 in each row are arranged in a first sub-row 2*b*1 and a second sub-row 2*b*2. The first sub-row 2*b*1 and the second sub-row 2*b*2 are arranged along a direction perpendicular to the row direction X. The first light-emitting units 20*a* each include at least three light-emitting devices 2*a*. The second light-emitting units 20*b* each include at least three light-emitting devices 2*a*.

A number of the light-emitting devices 2*a* in the first light-emitting unit 20*a* gradually decreased along a direction from the first sub-row 2*b*1 to the second sub-row 2*b*2. A number of the light-emitting devices 2*a* in the second light-emitting unit 20*b* is gradually increased along a direction from the first sub-row 2*b*1 to the second sub-row 2*b*2

In the embodiment, an occupied area of the first light-emitting unit 20*a* and an occupied area of the second light-emitting unit 20*b* are complementary in the row direction X, so as to increase a space utilization rate of the light-emitting area fa.

Optionally, when a pattern of the first light-emitting unit 20*a* is provided with a narrow top and a wide bottom, a pattern of the second light-emitting unit 20*b* is provided with a narrow bottom and a wide top. For example, when a virtual line for connecting centers of outmost light-emitting devices 2*a* in the first light-emitting unit 20*a* defines a regular triangle, a virtual line for connecting centers of outmost light-emitting devices 2*a* in the second light-emitting unit 20*b* defines an inverted triangle. For example, when a virtual line for connecting centers of outmost light-emitting devices 2*a* in the first light-emitting unit 20*a* defines a regular trapezoid, a virtual line for connecting centers of outmost light-emitting devices 2*a* in the second light-emitting unit 20*b* defines an inverted trapezoid.

Optionally, among the first light-emitting unit 20*a* and the second light-emitting unit 20*b* adjacent to each other, a number of the light-emitting devices 2*a* in the first sub-row 2*b*1 is equal to a number of the light-emitting devices 2*a* in the second sub-row 2*b*2.

Optionally, among the first light-emitting unit 20*a* and the second light-emitting unit 20*b* adjacent to each other, a distance between every two adjacent light-emitting devices 2*a* in the row direction X is constant.

It can be understood that, the light-emitting devices 2*a* with different numbers are provided in corresponding sub-rows to realize space complementarity in the row direction X in the embodiment. Correspondingly, in some embodiments, the light-emitting devices 2*a* with different distribution densities may be provided in corresponding sub-rows to realize space complementarity in the row direction X.

Optionally, the light-emitting area fa includes first light-emitting areas fa1 and second light-emitting areas fa2 arranged along the extending direction of the irregular boundary yx, and the first light-emitting area fa1 is located at a side of an adjacent second light-emitting area fa2.

The first light-emitting units 20*a* and the second light-emitting units 20*b* are disposed in the first light-emitting areas fa1. The plurality of light-emitting units 20 further include a plurality of third light-emitting units 20*c* arranged in rows. At least one row of the third light-emitting units 20*c* are disposed in each second light-emitting area fa2.

The third light-emitting units 20*c* each include one or more light-emitting devices 2*a*, and the light-emitting devices 2*a* are arranged in a matrix.

In can be understood that, space patterns of areas of the light-emitting area fa corresponding to different parts of the irregular boundary yx will also change according to change of the irregular boundary yx. Therefore, light-emitting devices 2*a* arranged in different layout patterns are configured corresponding to various space patterns, so as to suit the irregular areas, thereby in turn achieving that the luminance at the irregular boundary yx is similar to the luminance of other areas.

In the embodiment, that the light-emitting devices 2*a* in the second light-emitting area fa2 are arranged in the matrix achieves effect of transiting two adjacent first light-emitting areas fa1. On the one hand, the areas at the irregular boundary yx can be reasonably suited according to a shape of the irregular boundary yx; on the other hand, the luminescent of the light-emitting area fa can be balanced.

Optionally, the first light-emitting areas fa1 and the second light-emitting areas fa2 are alternately arranged along the extending direction of the irregular boundary yx. In this way, the luminescent of the light-emitting area fa is further balanced.

In some embodiments, the light-emitting area fa may be a layout of the first light-emitting areas fa1.

Optionally, a distance between every two adjacent light-emitting devices 2*a* in the first sub-row 2*b*1 is equal to a distance between every two adjacent light-emitting devices 2*a* in the second sub-row 2*b*2. In this way, the light-emitting devices 2*a* can be uniformly arranged in the first light-emitting area fa1, so as to improving uniformity of luminance thereof.

Optionally, a distance between every two adjacent light-emitting devices 2*a* in the first light-emitting area fa1 corresponding to the row direction X is defined as a first distance d1. A distance between every two adjacent light-emitting devices 2*a* in the second light-emitting area fa2 corresponding to the row direction X is defined as a second distance d2. The first distance d1 is equal to the second distance d2. In this way, the light-emitting devices 2*a* can be uniformly arranged in the light-emitting area fa, so as to improving uniformity of luminance thereof.

In embodiment III of the present disclosure, the light-emitting devices 2*a* arranged along the extending direction of the irregular boundary yx are provided to adaptively suit the area adjacent to the irregular boundary yx, so as to improve space utilization rate of improve luminance at the irregular boundary yx, and improve uniformity of overall luminance of the backlight panel 300.

Optionally, in some second light-emitting areas fa2, the second distance d2 decreases in a direction from the irregular boundary yx towards a center of the corresponding second light-emitting area fa2. Therefore, the space pattern of the second light-emitting area fa2 can be more subtly adjusted, so as to improve space utilization rate of the second light-emitting area fa2. In addition, a gradient design is achieved in this way, so as to further adjust the uniformity of luminance of the light-emitting area fa.

The backlight panels according to some embodiments of the present disclosure have been described above in detail. The illustration of the above embodiments is intended only to assist in understanding the technical solutions and core ideas of the present disclosure. Those skilled in the art can make various changes and modifications without departing from the spirit of the present disclosure. Therefore, the content of the specification is not intended to limit the present disclosure.

What is claimed is:

1. A backlight panel, comprising:

a substrate comprising a first light-emitting area and a second light-emitting area, wherein the first light-emitting area overlaps a center of the backlight panel, the second light-emitting area is located on a side of the first light-emitting area, a boundary of the second light-emitting area close to the first light-emitting area coincides with a boundary of the first light-emitting area to form a first coincident boundary, and a boundary of the second light-emitting area away from the first light-emitting area coincides with a boundary of the backlight panel to form a second coincident boundary;

a plurality of first light-emitting devices arranged, in rows and in columns, in the first light-emitting area; and a plurality of second light-emitting devices arranged, in rows and in columns, in the second light-emitting area, wherein the first light-emitting devices and the second light-emitting devices have the same row direction and column direction;

in the row direction, each of the second light-emitting devices has a distance from another adjacent one of the second light-emitting devices; and the distance between at least one of the second light-emitting devices closest to the second coincident boundary and another adjacent one of the second light-emitting devices in the row direction is less than a distance between any two adjacent ones of the first light-emitting devices in the row direction; and wherein the second light-emitting area comprises a gradient subarea and a non-gradient subarea arranged along the column direction;

in the gradient subarea, the distance between each of the second light-emitting devices closest to the second coincident boundary and another adjacent one of the second light-emitting devices in the row direction is less than the distance between any two adjacent ones of the first light-emitting devices in the row direction, and the distance between two adjacent ones of the second light-emitting devices in the row direction increases along a direction from the second coincident boundary to the first light-emitting area; and in the non-gradient subarea, the distance between two adjacent ones of the second light-emitting devices in the row direction is constant.

2. The backlight panel according to claim 1, wherein the distance between two adjacent ones of the second light-emitting devices in the row direction increases along a direction from the second coincident boundary to the first light-emitting area.

3. The backlight panel according to claim 2, wherein the distance between two adjacent ones of the second light-emitting devices in the row direction is less than the distance between any two adjacent ones of the first light-emitting devices in the row direction.

4. The backlight panel according to claim 1, wherein the second coincident boundary intersects the row direction.

5. The backlight panel according to claim 4 wherein the second coincident boundary is an irregular boundary.

6. The backlight panel according to claim 5, wherein an extending direction of the irregular boundary intersects the row direction non-perpendicularly.

7. The backlight panel according to claim 5, wherein the irregular boundary comprises an arc boundary.

8. The backlight panel according to claim 5, wherein the irregular boundary comprises a circular arc boundary.

9. The backlight panel according to claim 5, wherein the irregular boundary comprises a first oblique boundary and a second oblique boundary connected to the first oblique boundary, and the first oblique boundary intersects the second oblique boundary non-perpendicularly.

10. The backlight panel according to claim 1, wherein the distance between any two adjacent ones of the first light-emitting devices in the row direction is constant, and in the non-gradient subarea, the distance between two adjacent ones of the second light-emitting devices in the row direction is equal to the distance between any two adjacent ones of the first light-emitting devices in the row direction.

11. The backlight panel according to claim 1, wherein the second coincident boundary is an irregular boundary, and the irregular boundary comprises a first oblique boundary and a second oblique boundary connected to the first oblique boundary, the gradient subarea is correspondingly defined at a connecting portion of the first oblique boundary and the second oblique boundary, and the gradient subarea comprises a part of the first oblique boundary and a part of the second oblique boundary.

12. The backlight panel according to claim 1, wherein each of the first light emitting devices and the second light emitting devices is a micro-LED or a mini-LED.

13. The backlight panel according to claim 1, wherein the second light-emitting area comprises two sub-areas respectively located on opposite sides of the first light-emitting area in the row direction, and the second coincident boundary comprises two sub-coincident boundaries, and each of the two sub-areas comprises a boundary away from the first light-emitting area coinciding with the boundary of the backlight panel to form a corresponding one of the two sub-coincident boundaries.

14. The backlight panel according to claim 13, wherein the second light-emitting devices located in the two sub-areas are symmetrically arranged relative to a central axis of the first light-emitting area parallel to the column direction.

15. The backlight panel according to claim 13, wherein in each of the two sub-areas, the distance between two adjacent ones of the second light-emitting devices in the row direction increases along a direction from a corresponding one of the two sub-coincident boundaries to the first light-emitting area.

16. The backlight panel according to claim 15, wherein the distance between two adjacent ones of the second light-emitting devices in the row direction is less than the distance between any two adjacent ones of the first light-emitting devices in the row direction.

17. A backlight panel, comprising:

a substrate comprising a first light-emitting area and a second light-emitting area, wherein the first light-emitting area overlaps a center of the backlight panel, the second light-emitting area is located on a side of the first light-emitting area, a boundary of the second light-emitting area close to the first light-emitting area coincides with a boundary of the first light-emitting area to form a first coincident boundary, and a boundary of the second light-emitting area away from the first light-emitting area coincides with a boundary of the backlight panel to form a second coincident boundary;

a plurality of first light-emitting devices arranged, in rows and in columns, in the first light-emitting area; and a plurality of second light-emitting devices arranged, in rows and in columns, in the second light-emitting area, wherein the first light-emitting devices and the second light-emitting devices have the same row direction and column direction;

in the row direction, each of the second light-emitting devices has a distance from another adjacent one of the second light-emitting devices; and the distance between at least one of the second light-emitting devices closest to the second coincident boundary and another adjacent one of the second light-emitting devices in the row direction is less than a distance between any two adjacent ones of the first light-emitting devices in the row direction;

wherein the second light-emitting area comprises two sub-areas respectively located on opposite sides of the first light-emitting area in the row direction, and the second coincident boundary comprises two sub-coincident boundaries, and each of the two sub-areas comprises a boundary away from the first light-emitting area coinciding with the boundary of the backlight panel to form a corresponding one of the two sub-coincident boundaries; and wherein each of the two sub-areas comprises a gradient subarea and a non-gradient subarea arranged along the column direction;

in the gradient subarea, the distance between each of the second light-emitting devices closest to the second coincident boundary and another adjacent one of the second light-emitting devices in the row direction is less than the distance between any two adjacent ones of the first light-emitting devices in the row direction, and the distance between two adjacent ones of the second light-emitting devices in the row direction increases along a direction from a corresponding one of the two sub-coincident boundaries to the first light-emitting area; and in the non-gradient subarea, the distance between two adjacent ones of the second light-emitting devices in the row direction is constant.

18. The backlight panel according to claim 17, wherein the distance between any two adjacent ones of the first light-emitting devices in the row direction is constant, and in the non-gradient subarea, the distance between two adjacent ones of the second light-emitting devices in the row direction is equal to the distance between any two adjacent ones of the first light-emitting devices in the row direction.

19. The backlight panel according to claim 17, wherein the second coincident boundary is an irregular boundary, and the irregular boundary comprises a first oblique boundary and a second oblique boundary connected to the first oblique boundary, the gradient subarea is correspondingly defined at a connecting portion of the first oblique boundary and the second oblique boundary, and the gradient subarea comprises a part of the first oblique boundary and a part of the second oblique boundary.

20. The backlight panel according to claim 17, wherein the second light-emitting devices located in the two subareas are symmetrically arranged relative to a central axis of the first light-emitting area parallel to the column direction.

* * * * *